(12) United States Patent
Read

(10) Patent No.: US 8,499,344 B2
(45) Date of Patent: Jul. 30, 2013

(54) AUDIO-VIDEO TELEPHONY WITH FIREWALLS AND NETWORK ADDRESS TRANSLATION

(75) Inventor: Stephen Michael Read, Summertown (GB)

(73) Assignee: Cisco Technology, Inc., San Jose, CA (US)

( * ) Notice: Subject to any disclaimer, the term of this patent is extended or adjusted under 35 U.S.C. 154(b) by 2612 days.

(21) Appl. No.: 10/332,785

(22) PCT Filed: Jul. 24, 2001

(86) PCT No.: PCT/GB01/03308
§ 371 (c)(1),
(2), (4) Date: Jun. 10, 2003

(87) PCT Pub. No.: WO02/11400
PCT Pub. Date: Feb. 7, 2002

(65) Prior Publication Data
US 2004/0037268 A1    Feb. 26, 2004

(30) Foreign Application Priority Data
Jul. 28, 2000    (GB) .................................. 0018547.0

(51) Int. Cl.
*H04L 29/06*    (2006.01)
(52) U.S. Cl.
USPC .......................................................... 726/11
(58) Field of Classification Search
USPC .......................................................... 726/11
See application file for complete search history.

(56) References Cited

U.S. PATENT DOCUMENTS

| 5,301,320 A | 4/1994 | McAtee et al. |
| 5,781,550 A | 7/1998 | Templin et al. |

(Continued)

FOREIGN PATENT DOCUMENTS

| EP | 0 615 198 | 9/1994 |
| EP | 0954155 | 3/1999 |

(Continued)

OTHER PUBLICATIONS

Keating, Tom, "Leaping over H.323 Hurdles", Jan. 2000, pp. 1-8.*

(Continued)

*Primary Examiner* — Jeffrey D Popham
(74) *Attorney, Agent, or Firm* — Oblon, Spivak, McClelland, Maier & Neustadt, L.L.P.

(57) ABSTRACT

The present invention relates to a communications system (1) for making multimedia calls. The system comprises two multimedia terminals (10,12) and communication means for making a multimedia call over a shared communications network (20), including a firewall (26) through which the multimedia call must pass, and which restricts certain types of communication. Each terminal (10,12) has a number of logical communication ports for the multimedia call, including at least one dynamically assigned port. In the course of setting up the multimedia call, at least one of the terminals (10,12) is adapted to send a request to the other of the terminals to open up one or more of the dynamic ports in the other terminal. The system includes a proxy server (40) between the terminals (10,12) that acts for each terminal as a proxy for the other terminal during the course of the call. The proxy server (40) has logical communication ports for communication with the terminals including one or more pre-assigned ports. The firewall (26) is configured not to restrict communication between one or both terminals (10,12) and the pre-assigned port(s) of the proxy server (40). The proxy server (40) is configured to receive and forward the request(s) to open up said dynamic port(s) via one of its pre-assigned ports.

21 Claims, 13 Drawing Sheets

U.S. PATENT DOCUMENTS

| | | | |
|---|---|---|---|
| 6,128,298 A | 10/2000 | Wootton et al. | |
| 6,138,162 A | 10/2000 | Pistriotto et al. | 709/229 |
| 6,360,265 B1 | 3/2002 | Falck et al. | |
| 6,401,128 B1 | 6/2002 | Stai et al. | |
| 6,438,597 B1 | 8/2002 | Mosberger et al. | |
| 6,449,251 B1* | 9/2002 | Awadallah et al. | 370/229 |
| 6,470,020 B1* | 10/2002 | Barker et al. | 370/401 |
| 6,473,406 B1 | 10/2002 | Coile et al. | |
| 6,631,416 B2 | 10/2003 | Bendinelli et al. | |
| 6,631,417 B1 | 10/2003 | Balabine | |
| 6,674,758 B2 | 1/2004 | Watson | |
| 6,757,732 B1* | 6/2004 | Sollee et al. | 709/227 |
| 6,885,658 B1* | 4/2005 | Ress et al. | 370/352 |
| 6,925,076 B1* | 8/2005 | Dalgic et al. | 370/356 |
| 6,937,612 B1* | 8/2005 | Mauger et al. | 370/465 |
| 7,069,432 B1* | 6/2006 | Tighe et al. | 713/151 |
| 2002/0023143 A1 | 2/2002 | Stephenson et al. | |
| 2002/0042832 A1 | 4/2002 | Fallentine et al. | |
| 2002/0056008 A1 | 5/2002 | Keane et al. | |
| 2002/0085561 A1 | 7/2002 | Choi et al. | |
| 2002/0114319 A1 | 8/2002 | Liu et al. | |
| 2002/0114322 A1 | 8/2002 | Xu et al. | |
| 2002/0114333 A1 | 8/2002 | Xu et al. | |
| 2002/0122416 A1 | 9/2002 | Xu et al. | |
| 2002/0133534 A1 | 9/2002 | Forslow | |
| 2002/0138627 A1 | 9/2002 | Frantzen et al. | |
| 2002/0141352 A1 | 10/2002 | Fangman et al. | |
| 2002/0141384 A1 | 10/2002 | Liu et al. | |
| 2002/0141389 A1 | 10/2002 | Fangman et al. | |
| 2002/0143855 A1 | 10/2002 | Traversat et al. | |
| 2002/0152325 A1 | 10/2002 | Elgebaly et al. | |
| 2002/0199114 A1 | 12/2002 | Schwartz | |
| 2003/0009561 A1 | 1/2003 | Sollee | |
| 2003/0033418 A1 | 2/2003 | Young et al. | |
| 2003/0056002 A1 | 3/2003 | Trethewey | |
| 2003/0065944 A1 | 4/2003 | Mao et al. | |
| 2003/0084162 A1 | 5/2003 | Johnson et al. | |
| 2003/0093563 A1 | 5/2003 | Young et al. | |
| 2003/0108041 A1 | 6/2003 | Aysan et al. | |
| 2003/0110276 A1 | 6/2003 | Riddle | |
| 2003/0112809 A1 | 6/2003 | Bharali et al. | |
| 2003/0112823 A1 | 6/2003 | Collins et al. | |
| 2003/0140142 A1 | 7/2003 | Marples et al. | |
| 2003/0152034 A1 | 8/2003 | Zhang et al. | |
| 2003/0154306 A1 | 8/2003 | Perry | |
| 2003/0188001 A1 | 10/2003 | Eisenberg et al. | |
| 2003/0191848 A1 | 10/2003 | Hesselink et al. | |
| 2003/0191970 A1 | 10/2003 | Devine et al. | |
| 2003/0195861 A1 | 10/2003 | McClure et al. | |
| 2003/0212772 A1 | 11/2003 | Harris | |
| 2003/0212795 A1 | 11/2003 | Harris et al. | |
| 2003/0217039 A1 | 11/2003 | Kurtz et al. | |
| 2003/0229718 A1 | 12/2003 | Tock et al. | |
| 2003/0233471 A1 | 12/2003 | Mitchell et al. | |
| 2003/0233475 A1 | 12/2003 | Maufer et al. | |
| 2004/0006643 A1 | 1/2004 | Dolson et al. | |
| 2004/0015728 A1 | 1/2004 | Cole et al. | |
| 2004/0019808 A1 | 1/2004 | Devine et al. | |
| 2004/0028035 A1 | 2/2004 | Read | |
| 2005/0210292 A1 | 9/2005 | Adams et al. | |

FOREIGN PATENT DOCUMENTS

| | | |
|---|---|---|
| EP | 1081918 | 7/2001 |
| GB | 2 323 757 A | 9/1998 |
| GB | 2323757 A | 9/1998 |
| WO | WO 0115397 | 1/2001 |

OTHER PUBLICATIONS

Davies, S. et al., "Traversal of Non-Protocol Aware Firewalls & NATS", Internet Engineering Task Force, Internet Draft, Oct. 12, 2001, pp. 1-32.

Davies, S. et al., "Traversal of Non-Protocol Aware Firewalls & NATS", Internet Engineering Task Force, Internet Draft, Mar. 18, 2001, pp. 1-30.

Canadian Office Action issued Nov. 16, 2009 in Canadian Patent Application No. 2,415,357.

PCT Patent Office International Search Report, Dec. 17, 2011.

Christopher Rensing et al., VDMFA, eine veteilte dynamische Firewallarchitektur fur Miltimedia-Dienste, Internet, Mar. 31, 1999.

Newport Networks, http://www.Newport-networks.com/downloads/FW-NAT-Trav-WP.pdf., 12 pages, "Solving the Firewall and NAT Traversal Issues for Multimedia Over IP Services" 2004.

J. Rosenberg, et al., Network Working Groups, ftp://ftp.rfc-edltor.org/in-notes/rfc3489.txt, pp. 1-41, "Stun-Simple Traversal of User Datagram Protocol (UDP) Through Network Address Translators (NATS)", Mar. 2003.

J. Rosenberg, et al., MIDCOM, http://www.iptel.org/info/players/ietf/f . . . 1.nat/draft-rosenberg-midcom-turn-01.txt, pp. 1-36, "Traversal Using Relay NAT (Turn) Draft-Rosenberg-Midcom-Turn-01", Mar. 3, 2003.

S. Suri, et al., Proceedings of the 1999 10$^{th}$ Annual ACM-SIAM Symposium on Discrete Algorithms, pp. S969-S970, "Packet Filtering in High Speed Networks", Jan. 17-19, 1999.

K. Terao, et al., Proceedings of the 1999 Internet Workshop (WS '99). Cat. No. 99EX385, pp. 32-39, "A Shared Secure Server for Multiple Closed Networks", Feb. 18-20, 1999.

N. Yoshiura, et al., Tokyo Inst of Technol., Joho Shori Gakkai Kenkyu Hokoku, vol. 99, No. 77, pp. 1-6, "Routing Control for a Network Including Public Address and Private Address Networks", 1999, (abstract only).

P. Francis, et al., SIGCOMM '01, pp. 69-80, "IPNL: A NAT-Extended Internet Architecture", Aug. 27-31, 2001.

M. J. Freedman, et al., CCS '02, pp. 193-206, "TARZAN: A Peer-To-Peer Anonymizing Network Layer", Nov. 18-22, 2002.

H. T. Kung, et al., 2002 Military Communications Conference. Proceedings (Cat. No. 02CH37397), vol. 1, pp. 389-394, "An IP-Layer Anonymizing Infrastructure", Oct. 7-10, 2002 (Abstract only).

H. Furukawa, et al., IEIC Technical Report, Denshi Joho Tsushin Gakkai Gijutsu Kenkyu Hokoku, vol. 103, No. 385, pp. 5-8, "Network Architecture for IP-VPN Proof Against DOS Attacks", 2003.

J. Son, Journal of Kiss: Computing Practices, Korea Inf. Sci. Soc., vol. 9, No. 1, pp. 47-59, "A NAT Proxy Server for an Internet Telephony Service", Feb. 2003 (abstract only).

David Koblas et al., "Socks", pp. 77-83, USENIX Symposium Proceedings, UNIX Security III, Sep. 14-16, 1992.

Marcus Leech et al., "Socks Protocol Version 5", Mar. 1996.

UK Patent Office Search Report, May 24, 2001.

PCT Patent Office International Search Report, Dec. 17, 2001.

Christoph Rensing et al., VDMFA, eine verteilte dynamische Firewallarchitektur fur Miltimedia-Dienste, Internet, Mar. 31, 1999.

\* cited by examiner

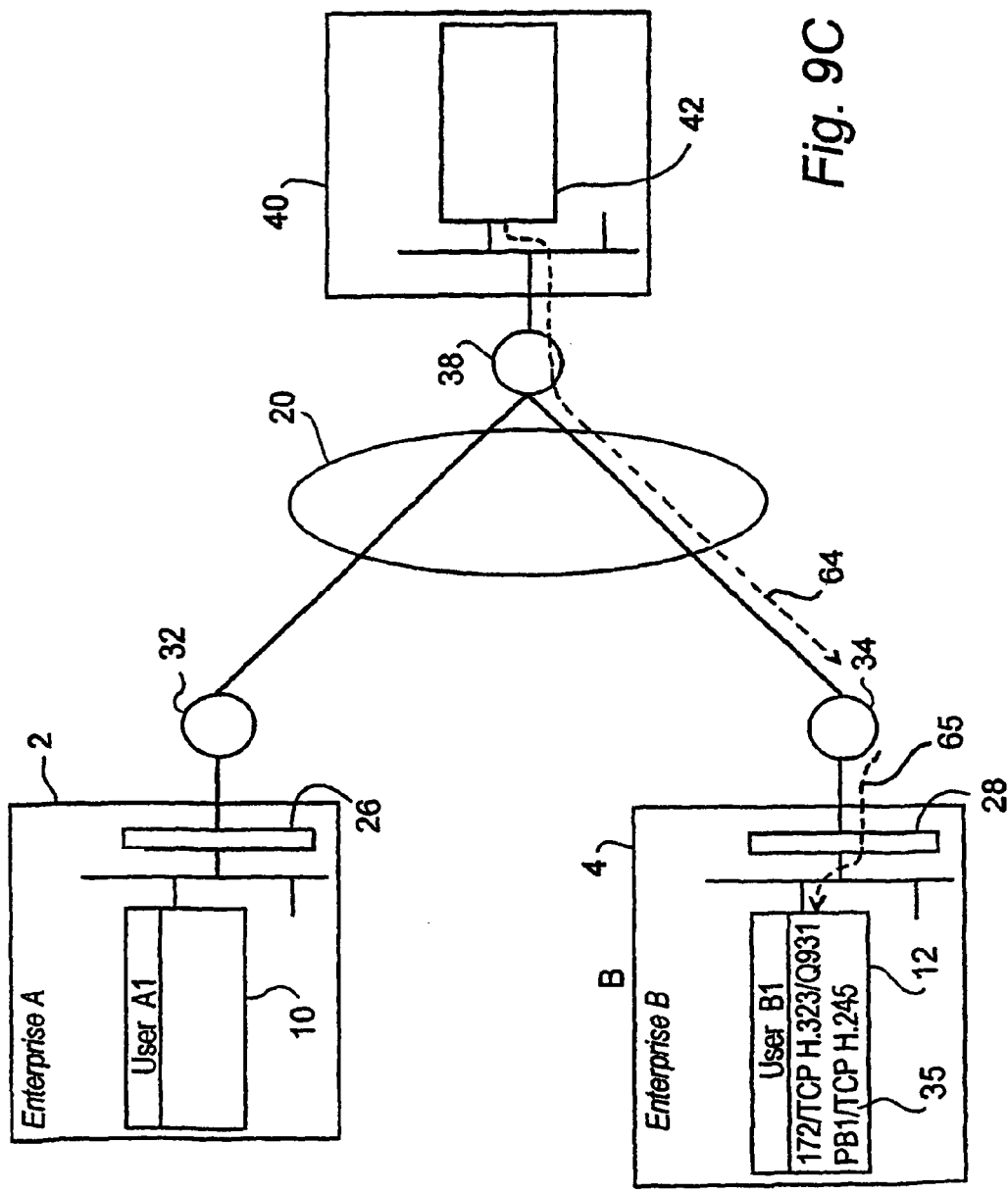

AUDIO-VIDEO TELEPHONY WITH FIREWALLS AND NETWORK ADDRESS TRANSLATION

BACKGROUND a. Field of the Invention

The present invention relates to a communications system for making multimedia calls.

b. Related Art

The rapidly evolving IP (Internet Protocol) data network is creating new opportunities and challenges for multimedia and voice communications service providers. Unprecedented levels of investment are being made in the data network backbone by incumbent telecommunication operators and next generation carriers and service providers. At the same time, broadband access technologies such as DSL and cable modems are bringing high speed Internet access to a wide community of users. The vision of service providers is to make use of the IP data network to deliver new voice, video and data services right to the desktop, the office and the home alongside high speed Internet access.

The importance of standards for wide spread communications is fundamental if terminals from different manufacturers are to inter-operate. In the multimedia arena, the current standard for real-time communications over packet networks (such as IP data networks) is the ITU standard. H.323. H.323 is now a relatively mature standard having support from the multimedia communications industry that includes companies such as Microsoft, Cisco and Intel. For example, it is estimated that 75% of PCs have Microsoft's NetMeeting (trade mark) program installed. NetMeeting is an H.323 compliant software application used for multimedia (voice, video and data) communication. Interoperability between equipment from different manufacturers is also now being achieved. Over 120 companies world-wide attended the last interoperability event hosted by the International Multimedia Telecommunications Consortium (IMTC), an independent organisation that exists to promote the interoperability of multimedia communications equipment. The event is a regular one that allows manufacturers to test and resolve interworking issues.

Hitherto, there had been a number of barriers to the mass uptake of multimedia (particularly video) communications. Ease of use, quality, cost and communications bandwidth had all hampered growth in the market. Technological advances in video encoding, the ubiquity of cheap IP access and the current investment in the data network coupled with the rollout of DSL together with ISDN and Cable modem now alleviates most of these issues making multimedia and voice communications readily available.

As H.323 was being defined as a standard, it was assumed that there would be H.323-H.320 gateways that exist at the edge of network domains converting H.323 to H.320 for transport over the wide area between private networks. Therefore, implementations of H.323 over IP concentrated on communications within a single network.

However, IP continues to find favour as the wide area protocol. More and more organisations continue to base their entire data networks on IP. High speed Internet access, managed Intranets, Virtual Private Networks (VPNs) all based on IP are commonplace. The IP trend is causing H.320 as a multimedia protocol to decline. The market demand is to replace H.320 completely with H.323 over IP.

Unfortunately, unforeseen technical barriers to the real-world, wide area deployment of H.323 still exist. The technical barriers relate to the communications infrastructure at the boundaries of IP data networks.

The H.323 standard applies to multimedia communications over Packet Based Networks that have no guaranteed quality of service. It has been designed to be independent of the underlying transport network and protocols. Today the IP data network is the default and ubiquitous packet network and the majority (if not all) of implementations of H.323 are over an IP data network. Nevertheless, today, successful implementation of multimedia and voice communications are confined to Intranets or private managed IP networks because there are IP topological problems preventing the widespread deployment of H.323 between private IP networks and the public Internet or shared or managed IP networks.

The problems arise because of two IP technologies—Network Address Translation (NAT) and Firewalls.

NAT came about to solve the 'shortage of addresses' problem. Any endpoint or 'host' in an IP network has an 'IP address' to identify that endpoint so that data packets can be correctly sent or routed to it and packets received from it can be identified from where they originate. At the time of defining the IP address field no-one predicted the massive growth in desktop equipment. After a number of years of global IP deployment, it was soon realised that the number of endpoints wanting to communicate using the IP protocol would exceed the number of unique IP addresses possible from the address field. To increase the address field and make more addresses available would have required the entire IP infrastructure to be upgraded. (The industry is planning to do this with IP Version 6 at some point).

The solution of the day is now referred to as NAT. The first NAT solution, which is referred to as simple NAT in IETF RFC1631, uses a one-to-one mapping, came about before the World-Wide Web existed and when only a few hosts (e.g. email server, file transfer server) within an organisation needed to communicate externally to that organisation. NAT allows an enterprise to create a private IP network where each endpoint within that enterprise has an address that is unique only within the enterprise but is not globally unique. These are private IP addresses. This allows each host within an organisation to communicate (i.e. address) any other host within the organisation. For external communication, a public or globally unique IP address is needed. At the edge of that private IP network is a device that is responsible for translating a private IP address to/from a public IP address—the NAT function. The enterprise will have one or more public addresses belonging exclusively to the enterprise but in general fewer public addresses than hosts are needed either because only a few hosts need to communicate externally or because the number of simultaneous external communications is smaller. A more sophisticated embodiment of NAT has a pool of public IP addresses that are assigned dynamically on a first come first served basis for hosts needing to communicate externally. Fixed network address rules are required in the case where external equipment needs to send unsolicited packets to specific internal equipment.

Today we find that most private networks use private IP addresses from the 10.x.x.x address range. External communications are usually via a service provider that offers a service via a managed or shared IP network or via the public Internet. At the boundaries between each of the networks NAT is applied to change addresses to be unique within the IP network the packets are traversing. Simple NAT changes the complete IP address on a one-to-one mapping that may be permanent or dynamically created for the life of the communication session.

A consequence of NAT is that the private IP address of a host is not visible externally. This adds a level of security.

Web Servers, Mail Servers and Proxy Servers are examples of hosts that would need a static one-to-one NAT mapping to allow external communications to reach them.

While computers and networks connected via a common IP protocol made communications easier, the common protocol also made breaches in privacy and security much easier too. With relatively little computing skill it became possible to access private or confidential data and files and also to corrupt that business information maliciously. The industry's solution to such attacks is to deploy 'firewalls' at the boundaries of their private networks.

Firewalls are designed to restrict or 'filter' the type of IP traffic that may pass between the private and public IP networks. Firewalls can apply restrictions through rules at several levels. Restrictions may be applied at the IP address, the Port, the IP transport protocol (TCP or UDP for example) or the application. Restrictions are not symmetrical. Typically a firewall will be programmed to allow more communications from the private network (inside the firewall) to the public network (outside the firewall) than in the other direction.

With the birth of the World-Wide Web it has become increasingly difficult to apply firewall rules just to IP addresses. Any inside host (i.e. your PC) may want to connect to any outside host (the web server) dotted around the globe. The concept of a 'well known port' is applied to the problem. A port identifies one end of a point-to-point transport connection between 2 hosts. A 'well-known port' is a port that carries one 'known' type of traffic. IANA, the Internet Assigned Number Authority specifies the pre-assigned well-known ports and the type of traffic carried over them. For example port 80 has been assigned for web surfing (http protocol) traffic, port 25 Simple Mail Transport Protocol etc.

An example of a firewall filtering rule for Web Surfing would be:
  Any inside IP address/any port number may connect to any outside IP address/Port 80 using TCP (Transport Connection protocol) and HTTP (the application protocol for Web Surfing).

The connection is bi-directional so traffic may flow back from the Web Server on the same path. The point is that the connection has to be initiated from the inside.

An example of a firewall filtering rule for email may be:
Any outside IP address/any port number may connect to IP address 192.3.4.5/port 25 using TCP and SMTP.

The NAT function may change the destination IP address 192.3.4.5 to 10.6.7.8 which is the inside address of the mail server.

Filtering rules such as the following are frowned upon by IT managers:
  Any inside IP address/any port number may connect to any outside IP address/any port number for TCP or UDP and vice versa.

Such rules are tantamount to opening up the firewall, as it is too broad a filter.

Both NAT and firewall functions prevent H.323 communication working where NAT and firewall functions exist between the endpoints. This will typically be the case when the endpoints are in different private networks, when one endpoint is in a private network and the other endpoint is in the Internet or when the endpoints are in different managed IP networks.

H.323 has been designed to be independent of the underlying network and transport protocols. Nevertheless, implementation of H.323 in an IP network is possible with the following mapping of the main concepts:

| H.323 address: | IP address |
| H.323 logical channel: | TCP/UDP Port connection |

In the implementation of H.323 over IP, H.323 protocol messages are sent as the payload in IP packets using either TCP or UDP transport protocols. Many of the H.323 messages contain the H.323 address of the originating endpoint or the destination endpoint or both endpoints. In the IP world this means we have IP addresses inside an H.323 message that is sent in an IP packet whose header contains the IP addresses of source and destination hosts.

However, a problem arises in that simple NAT functions will change the IP addresses of source and destination hosts without changing the H.323 addresses in the H.323 payload. This causes the H.323 protocol to break and requires intermediary intelligence to manipulate H.323 payload addresses.

Because of the complexity of multimedia communications, H.323 requires several logical channels to be opened between the endpoint. Logical channels are needed for call control, capabilities exchange, audio, video and data. In a simple point-to-point H.323 multimedia session involving just audio and video, at least six logical channels are needed. In the IP implementation of H.323, logical channels are mapped to TCP or UDP port connection, many of which are assigned dynamically.

Another problem arises in that firewall functions filter out traffic on ports that they have no rules for. Either the firewall is opened, which defeats the purpose of the firewall, or much of the H.323 traffic will not pass through.

H.323 communication is therefore an anathema to firewalls. Either a firewall must become H.323 aware or some intermediary intelligence must manipulate the port assignments in a secure manner.

One possible solution to this problem would be a complete IP H.323 upgrade. This requires:
  H.323 upgrade to the simple NAT function at each IP network boundary. The NAT function must scan all H.323 payloads and consistently change IP addresses.
  H.323 upgrade to the firewall function at each IP network boundary. The firewall must understand and watch all H.323 communication so that it can open up the ports that are dynamically assigned and must filter all non-H.323 traffic on those ports.
  Deployment of H.323 intelligence at the boundary or in the shared IP network to resolve and arbitrate addresses. IP addresses are rarely used directly by users. In practice, IP address aliases are used. Intelligence is needed to resolve aliases to an IP address. This H.323 function is contained within H.323 entities called GateKeepers.
The disadvantages of this possible solution are:
Each organisation/private network must have the same level of upgrade for H.323 communication to exist.
The upgrade is costly. New functionality or new equipment must be purchased, planned and deployed. IT managers must learn about H.323.
The continual parsing of H.323 packets to resolve the simple NAT and firewall function places a latency burden on the signal at each network boundary. The latency tolerance for audio and video is very small.

As a result of these problems, the H.323 protocol is not being used for voice and multimedia communications when there is a firewall or network address translation (NAT). One approach has been to place H.323 systems on the public side of the firewall and NAT functions. This allows them to use H.323 while also allowing them to protect the remainder of their network. The disadvantages of this are:

1. The most ubiquitous device for video communications is the desktop PC. It is nonsensical to place all desktop computers on the public side!

2. The H.323 systems are not protected from attackers on the public side of the firewall.

3. The companies are not able to take advantage of the potentially ubiquitous nature of H.323, since only the special systems will be allowed to conduct H.323 communications.

4. The companies will not be able to take full advantage of the data-sharing facilities in H.323 because the firewall will prevent the H.323 systems from accessing the data. Opening the firewall to allow data-transfer functions from the H.323 system is not an option because it would allow an attacker to use the H.323 system as a relay.

H.323 is not the only protocol now being used for real-time voice and multimedia communications over IP networks. SIP (Session Initiation Protocol as define in the IETF RFC 2543), MGCP (Media Gateway Control Protocol), H.248 (sometimes referred to as Megaco—ITU's equivalent of MGCP,) have gained industry acceptance. All these protocols suffer the identical infrastructural problems caused by firewalls and NATs and cannot traverse them unaided.

SUMMARY OF THE INVENTION

It is an object of the present invention to address the problems caused by firewalls and NATs for voice and multimedia communications through firewalls and NATs in a common way for all protocols. Therefore, although the present invention is described with reference to the H.323 protocol it applies to all the real-time IP communication protocols including H.323, SIP, MGCP, Megaco and others. Likewise, the present invention applies to voice only as well as multimedia communications. Therefore, within the context of the description 'multimedia' means any combination of voice and/or video communications.

Accordingly, the invention provides a communications system for making a multimedia call, comprising, a first multimedia terminal, a second multimedia terminal, communication means for making a multimedia call over a shared communications network, said communication means including a first communication means and a second communication means associated respectively with the first multimedia terminal and the second multimedia terminal, the first communication means including a first firewall through which the multimedia call must pass, in which:

i) the first firewall is configured to restrict certain types of communication between the first terminal and the public shared communications network;

ii) each terminal has a number of logical communication ports for transmitting and/or receiving the multimedia call, including at least one dynamically assigned port;

iii) in the course of setting up a multimedia call, at least one of the terminals is adapted to send a request to the other of the terminals to open up one or more of the dynamic ports in the terminal receiving said request;

wherein:

iv) the system includes a proxy server between the first terminal and the second terminal that acts for each terminal as a proxy for the other terminal during the course of a multimedia call;

v) the proxy server has logical communication ports for communication with the terminals including one or more pre-assigned ports for communication with the first terminal;

vi) the first firewall is configured not to restrict communication between the first terminal and the pre-assigned port(s) of the proxy server; and vii) the proxy server is configured to receive and forward the request(s) to open up said dynamic port(s) via one of its pre-assigned ports.

Also according to the invention, there is provided a method of making a multimedia call using a communications system that comprises a first multimedia terminal, a second multimedia terminal, communication means including a first communication means and a second communication means associated respectively with the first multimedia terminal and the second multimedia terminal, wherein each terminal has a number of logical communication ports for transmitting and/or receiving the multimedia call, including at least one dynamically assigned port, and the first communication means includes a first firewall configured to restrict certain types of communication between the first terminal and the shared communications network, in which the method comprises the steps of:

a) setting up a multimedia call over a shared communications network with the first communications means and the second communications means between the first multimedia terminal and the second multimedia via the first firewall;

b) in the course of setting up a multimedia call, at least one of the terminals sends a request to the other of the terminals to open up one or more of the dynamic ports in the terminal receiving said request;

wherein the method comprises the steps of:

c) including a proxy server between the first terminal and the second terminal that acts for each terminal as a proxy for the other terminal during the course of a multimedia call, the proxy server having logical communication ports for communication with the terminals including one or more pre-assigned ports for communication with the first terminal;

d) configuring the first firewall not to restrict communication between the first terminal and the pre-assigned port(s) of the proxy server; and e) configuring the proxy server to receive and forward the request(s) to open up said dynamic port(s) via one of its pre-assigned ports.

Such a system may be used for making a multimedia call according to the H.323 or H.248 standard of the International Telecommunications Union. Alternatively, the system may be used for making a multimedia call according to the SIP or MGCP standard of the Internet Engineering Task Force. Furthermore, the proxy may support mixed protocol environments.

The shared communications network may comprise a public network such as the public switched telephone network (PSTN) and the public Internet data network, or it may be any other IP network where firewalls may be deployed to demarcate and restrict traffic crossing network boundaries. For example, in one embodiment of the invention, the proxy server is place in the de-militarised zone (DMZ) of an enterprise's network, where the firewall is restricting traffic passing into the private network from the DMZ.

The proxy server will usually be remote from both of the first multimedia terminal and the second multimedia terminal, for example being connected to both the first and second multimedia terminals through the shared IP network.

In many cases, the second communication means will also include a second firewall through which the multimedia call must pass. The second firewall may then be configured to restrict certain types of communication between the second terminal and the shared communications network. The proxy server will then have logical communication ports for communication with the terminals including one or more pre-assigned ports for communication with the second terminal. The second firewall can then be configured not to restrict communication between the second terminal and the pre-assigned port(s) of the proxy server.

In a preferred embodiment of the invention, the number of pre-assigned ports of the proxy server is less than or equal to the total number of dynamically assigned ports for the terminal(s). For example, the proxy server may have two pre-assigned ports, and preferably three pre-assigned ports, one for TCP and two for UDP.

The terminals may be adapted to transmit and/or receive multimedia media signals together with associated multimedia control signals, the control signals being sent to one of the pre-assigned ports and the media signals being sent to the other pre-assigned ports.

Preferably, at least one the logical communications ports is a pre-assigned port, said request being sent to the pre-assigned port as an initial request to initiate communication over the communication link.

The communication means may be adapted for making a multimedia call at least in part via the internet, in which case the proxy server will have a public internet protocol address by which the or each of the terminals communicate with the proxy server, the firewall(s) being configured not to restrict communication between the terminal(s) and the pre-assigned port(s) of the proxy server.

The invention is applicable to the case where there is one or more pair(s) of first terminals and of second terminals. For example, several first multimedia terminals at one site may each connect to corresponding other second multimedia terminals at a variety of other sites.

BRIEF DESCRIPTION OF THE DRAWINGS

The invention will be described by way of example, with reference to the accompanying drawings, in which.

DETAILED DESCRIPTION

Figure 1:
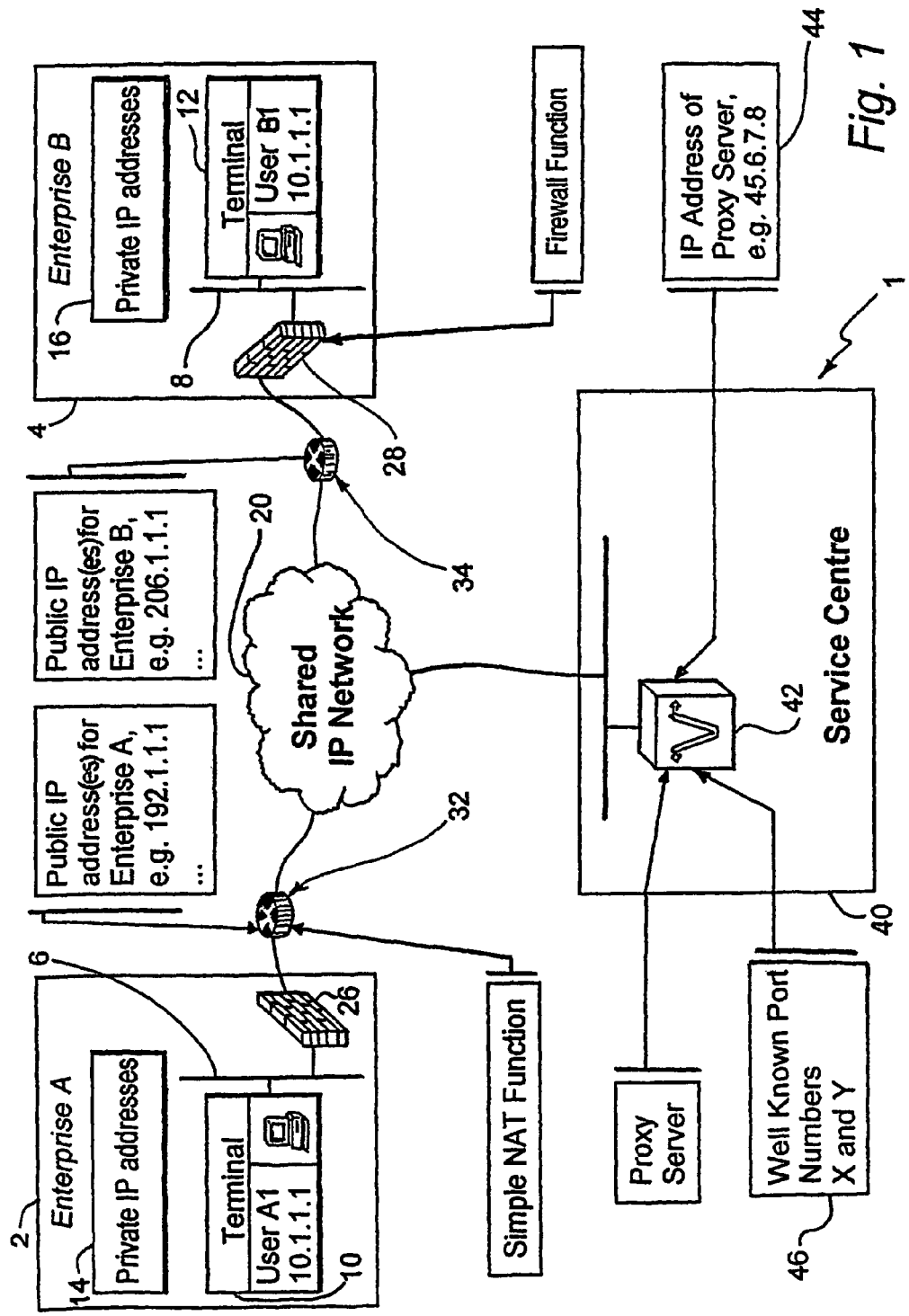
FIG. 1 is a schematic diagram of a communications system according to a preferred embodiment of the invention for making a multimedia call.

The alternative to a complete H.323 upgrade is presented in the example described with reference to FIG. 1. This shows a communication system 1 having a first enterprise 2 and a second enterprise 4, each of which include private networks 6,8 both of which have one or more H.323 terminals 10,12. Each private network 6,8 has private IP addresses 14,16 coincidentally within the 10.x.x.x address range. The private IP addresses 14,16 may result from a static assignment or dynamic assignment through normal DHCP procedures. External communication is via a shared, managed or public Internet 20. For external communication, the first enterprise 2 has a public IP address pool 22 beginning at 192.1.1.1 and the second enterprise 4 has a public IP address pool 24 beginning at 206.1.1.1. Each enterprise has a router 32,34 that is programmed with translation rules to perform a simple Network Address Translation (NAT) function, either a standing mapping between inside addresses 14,16 (private) and outside addresses 22,24 (public) or to make dynamic mappings based on which H.323 of the terminals 10,12 on the private network 6,8 connects first to the shared network 20 via the corresponding router 32,34.

The private networks 6,8 are each protected at their edge edges with firewall functions 26,28. The firewall functions are configured with the rules shown in Table 1 to allow H.323 traffic. The rules take into account the well known ports for H.323 and T.120, which are 1718, 1719, 1720 and 1503 and also two new well known ports proposed under the invention, referred to as X and Y.

TABLE 1

| Rule | From IP Address | From Port | To IP Address | To Port | IP protocol | Application |
|---|---|---|---|---|---|---|
| 1 | Any | Any | 224.0.1.41 | 1718 | UDP | GK discovery Requests |
| 2 | Proxy server | 1718 | Any | Any | UDP | GK discovery Responses |
| 3 | Any | Any | Proxy server | 1719 | UDP | GK Registration requests |
| 4 | Proxy server | 1719 | Any | Any | UDP | Gatekeeper Registration responses |
| 5 | Any | Any | Proxy server | 1720 | TCP | Outbound Call Control (Q.931) |
| 6 | Proxy server | 1720 | Any | Any | TCP | Inbound Call Control (Q.931) |
| 7 | Any | Any | Proxy server | Y | TCP | Outbound Media Control (H.245) |
| 8 | Proxy server | Y | Any | Any | TCP | Inbound Media Control (H.245) |
| 9 | Any | Any | Proxy server | X | UDP | Outbound Media (RTP) |
| 10 | Proxy server | X | Any | Any | UDP | Inbound Media (RTP) |
| 11 | Any | Any | Proxy server | Y | UDP | Outbound Media (RTCP) |
| 12 | Proxy server | Y | Any | Any | UDP | Inbound Media (RTCP) |
| 13 | Any | Any | Proxy server | 1503 | TCP | Outbound Data (T.120) |
| 14 | Proxy server | 1503 | Any | Any | TCP | Inbound Data (T.120) |

In the above table, the specifically listed port numbers are the registered port numbers according to standards agreed to by IANA.

In order for H.323 terminals 10 in the first enterprise 2 to communicate with other H.323 terminals 12 in the second enterprise 4, there must exist a shared network 20 to which a proxy server 40 is connected, for example, via a router 38. The proxy server 40 has a public IP address 44, for example 45.6.7.8. The proxy server would also have two new well known ports numbers X,Y 46 that would have to be agreed and registered in advance with IANA.

The proxy server 40 appears to H.323 terminals as if it is their H.323 gatekeeper (or SIP registrar for SIP terminals, etc.). During a call, to any one terminal the proxy server appears as the other or remote terminal. To gatekeepers, the proxy server appears as all their endpoints. The gatekeeper function (not shown) may be co-resident with the proxy server or remote from it.

When an H.323 terminal 10,12 is switched on it first discovers and then registers with the gatekeeper function through the proxy server 40 in order to make known that it is ready to make or receive multimedia calls. The registration process requires the terminal 10,12 to pass its own IP address 14,16 in an H.323 message to the gatekeeper function through the proxy server 40. When leaving the terminal, the source address field of the IP packet is the private IP address of the terminal 14,16. However, as that IP packet passes through the simple NAT function the source address in the'IP packet is changed to its public equivalent 22,24. Because the NAT function is unaware of the H.323 payload containing the private IP address of the terminal, this IP address is not changed. As the registration messages pass through the proxy server on the way to the gatekeeper, the proxy server 40 stores both the terminal's 'apparent' IP address 22,24 (i.e. where the packet appeared to come from following the NAT change) as well as the terminal's private or 'real' IP address 14,16. During future call control requests to the gatekeeper function, the proxy server would mandate that all call control will be handled by the various functions (call control, media control and media processing) within the proxy server at the proxy server's IP address 40. In this illustration of the invention, we have assumed that the proxy server is a single device with a single IP address. In other embodiments of the invention the 'proxy server' may be several co-operating devices. Additionally, the proxy server device(s) may each have one or multiple IP addresses. Where multiple IP addresses are used, the normal practise is allocate them from a single subnet, then the programming of the firewall rules becomes specifying the allowed ports to and from a subnet rather than individual IP addresses.

If the H.323 terminal 10,12 does not support a gatekeeper registration function, the terminal must be given a static private IP address. A static NAT rule then must be made in the simple NAT function of the router 32,34 and the proxy server 40 must be programmed with the static apparent IP address 14,16 and the real IP address 22,24 of the terminal 10,12. The terminal 10,12 is programmed to pass all call control requests to the proxy server 40 as in the previous case.

Figure 2:
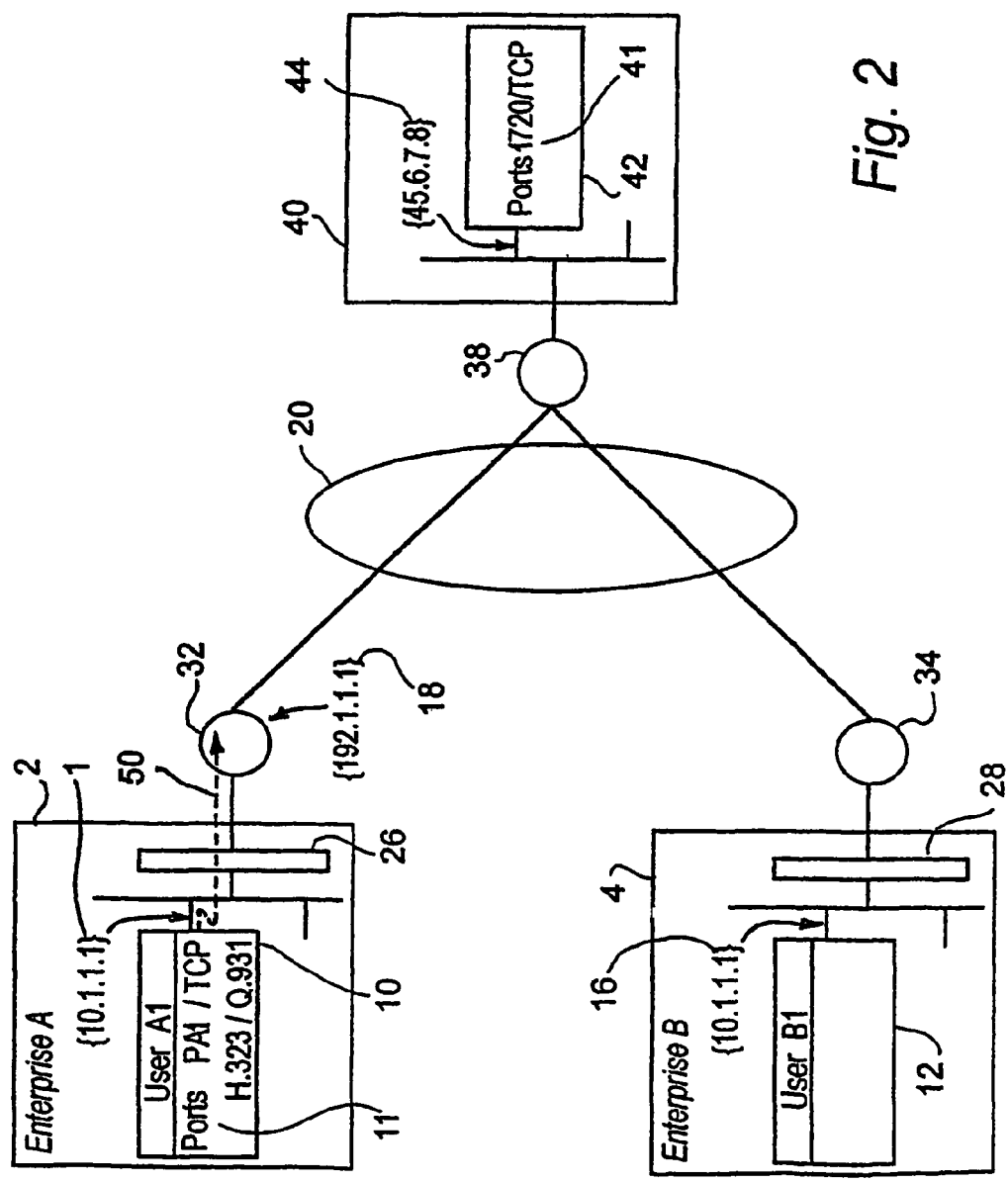
FIGS. 2 to 9 are schematic diagrams showing the method of setting up a multimedia call according to a preferred embodiment of the invention.
Figure 3:
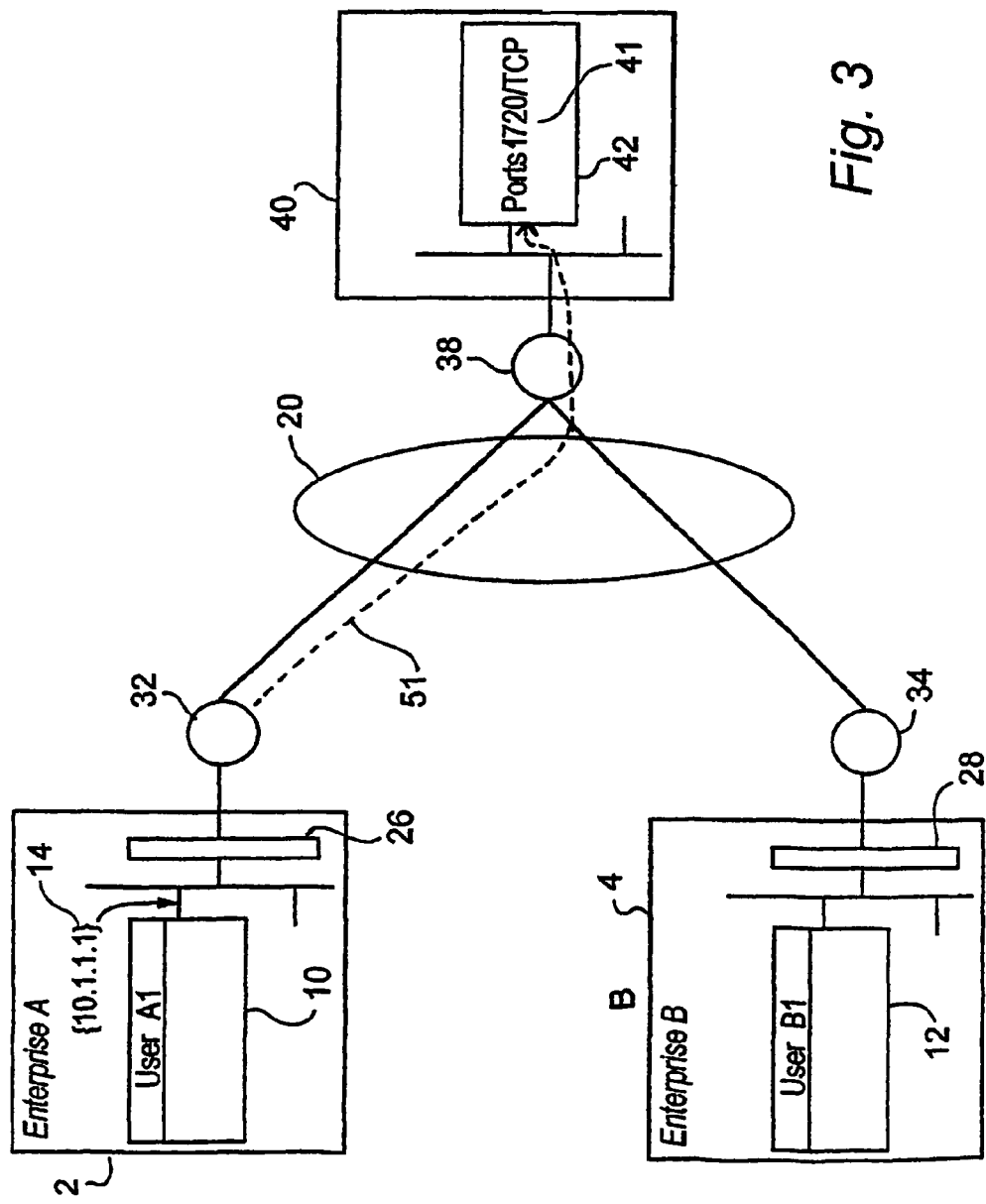

FIGS. 2 to 9 show a method of setting up a multimedia call according to a preferred embodiment of the invention. These drawings show seven steps or stages, as described below:

Step 1, FIGS. 2 and 3:

The user A at terminal A1 10 uses H.323 software to place a multimedia call to the user B at terminal B1 12. Software running in terminal A1 10 composes an H.323 setup message containing the identities of A and B, and the true IP address 14 of terminal A1 10 and the true IP address 44 of the proxy server 42. This message 50 is then placed from a local port PA1 11 in one or more TCP IP packets, which are labelled with terminal A1's 10 IP address 16 as source, and the proxy server's 42 IP address 44 as destination. The setup message is sent to a pre-assigned port 41 of the proxy server 42, here port number 1720. As these packets 50 pass through the simple Network Address Translation (NAT) function in router 32, the source IP address 14 in the IP packet is changed to the public equivalent IP address 18 (e.g. 10.1.1.1 becomes 192.1.1.1). The H.323 message 50 itself is unchanged.

This setup message transmitted by terminal A1 10 is represented by:

| TCP Packet | | Source | IP/Port: 10.1.1.1/PA1 |
| | | Destination | IP/Port: 45.6.7.8/1720 |
| H.323 | | Source | IP/Port: 10.1.1.1/PA1 |
| | | Destination | IP/Port: 45.6.7.8/1720 |

The setup message is altered by the router 32, and is then represented by:

| TCP Packet | | Source | IP/Port: 192.1.1.1/PA1 |
| | | Destination | IP/Port: 45.6.7.8/1720 |
| H.323 | | Source | IP/Port: 10.1.1.1/PA1 |
| | | Destination | IP/Port: 45.6.7.8/1720 |

Figure 4:
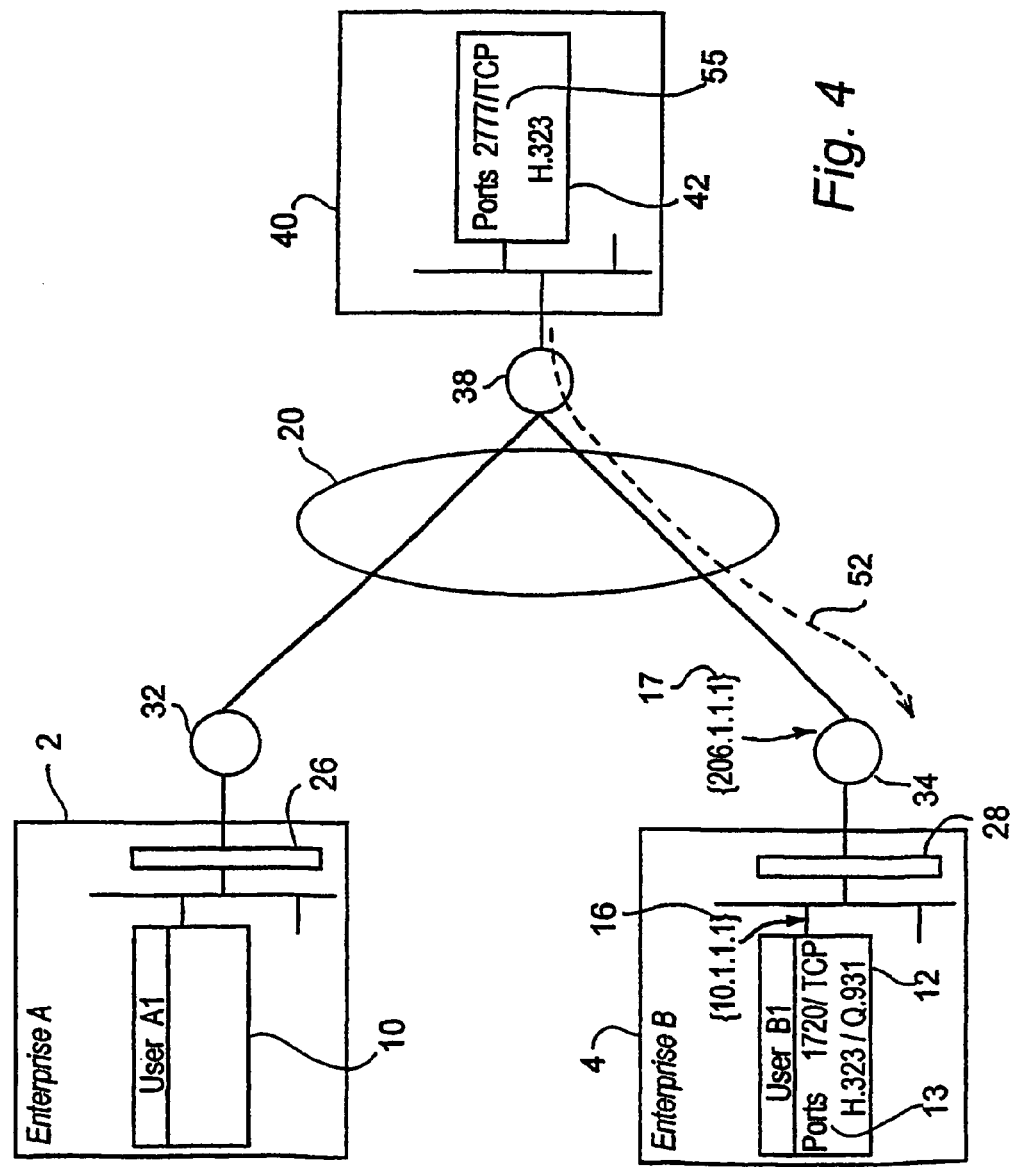

Step 2, FIGS. 3 and 4:

The H.323 setup message 51 reaches the proxy server 42, which determines the location of user B (in conjunction with some gatekeeper function, for example), and composes a similar H.323 new setup message 52 to send there. This new setup message 52 contains the identities of A and B, and the true IP address 44 (e.g. 45.6.7.8) of the proxy server 42 and the true IP address 16 (e.g. 10.1.1.1) of the terminal B1 12. The proxy server 42 then sends this message 52 from a pre-assigned port 55, here port number 2777, to the public IP' address 17 (e.g. 206.1.1.1) of terminal B1 12; the IP packets are labelled with the IP address 44 of the proxy server 42 as source, and the public IP address 17 of terminal B1 12 as destination.

The new setup message 52 forwarded by the proxy server 42 can be represented by:

| TCP Packet | | Source | IP/Port: 45.6.7.8/2777 |
| | | Destination | IP/Port: 206.2.1.1/1720 |
| H.323 | | Source | IP/Port: 45.6.7.8/2777 |
| | | Destination | IP/Port: 10.1.1.1/1720 |

Figure 5:
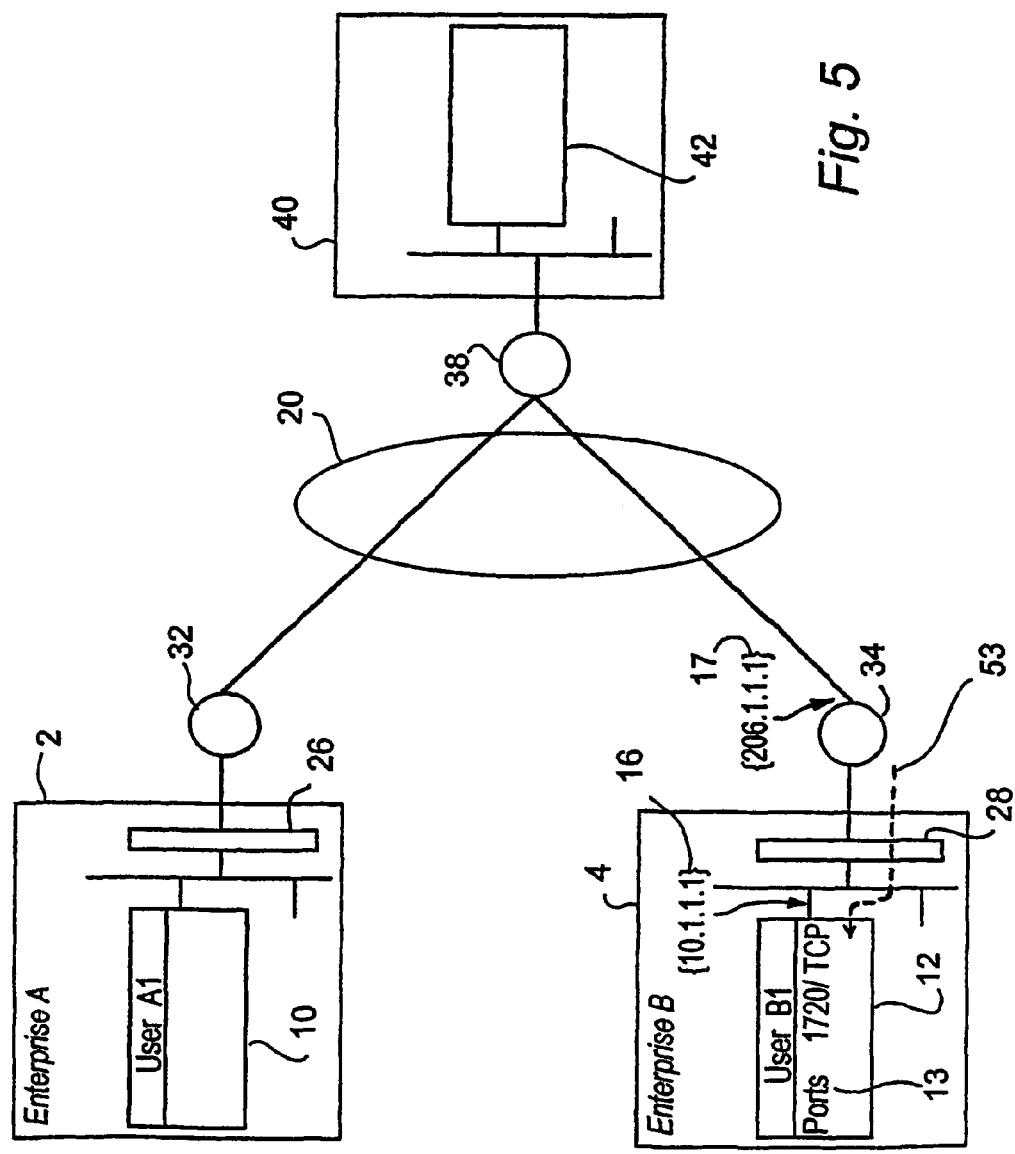

Step 3, FIGS. 4 and 5:

The simple NAT function in the router 34 changes the IP packets so that their destination address 17 becomes the true IP address 16 of terminal B1 12. The H.323 message 53 contained in the packets is not changed, but because the proxy server 42 inserted the true IP address 16 before sending the message 52, the message 53 forwarded by the router 34 now has the correct IP address 16. This forwarded message 53 contains information that identifies the call as originating with the user at terminal A1 10.

The setup message altered by the router 34 is then represented by:

| TCP Packet | | Source | IP/Port: 45.6.7.8/2777 |
| | | Destination | IP/Port: 10.1.1.1/1720 |
| H.323 | | Source | IP/Port: 45.6.7.8/2777 |
| | | Destination | IP/Port: 10.1.1.1/1720 |

Figure 6:
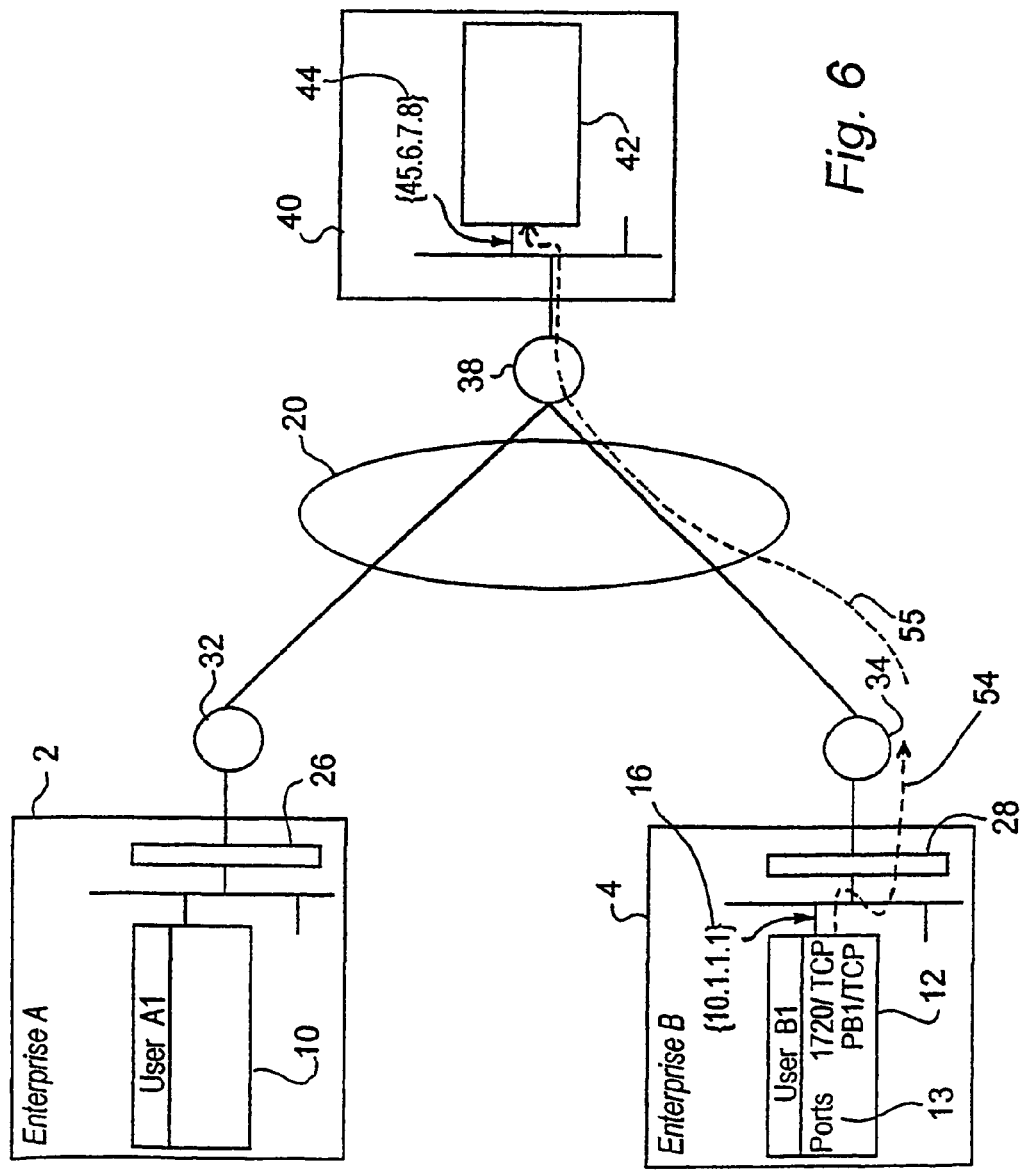

Step 4, FIG. 6:

The terminals A1 10 and B1 12 decide, for example in a process as set out by well-known internationally agreed standards, that they will send audio and/or video signals. The process is the same in either direction, and is also the same for audio as it is for video.

Terminal B1 12 prepares a new TCP port PB1 13 on which it will receive a connection from H.245 communication. It then sends an H.323 "connect" message 54 back to the proxy server 42. The address of the new port 10.1.1.1/PB1 is in the message 54.

This is represented by:

| TCP Packet | | Source | IP/Port: 10.1.1.1/1720 |
| | | Destination | IP/Port: 45.6.7.8/2777 |
| H.323 | | H.245 address | IP/Port: 10.1.1.1/PB1 |

The router 34 translates the message as:

| TCP Packet | | Source | IP/Port: 206.1.1.1/1720 |
| | | Destination | IP/Port: 45.6.7.8/2777 |
| H.323 | | H.245 address | IP/Port: 10.1.1.1/PB1 |

Figure 7:
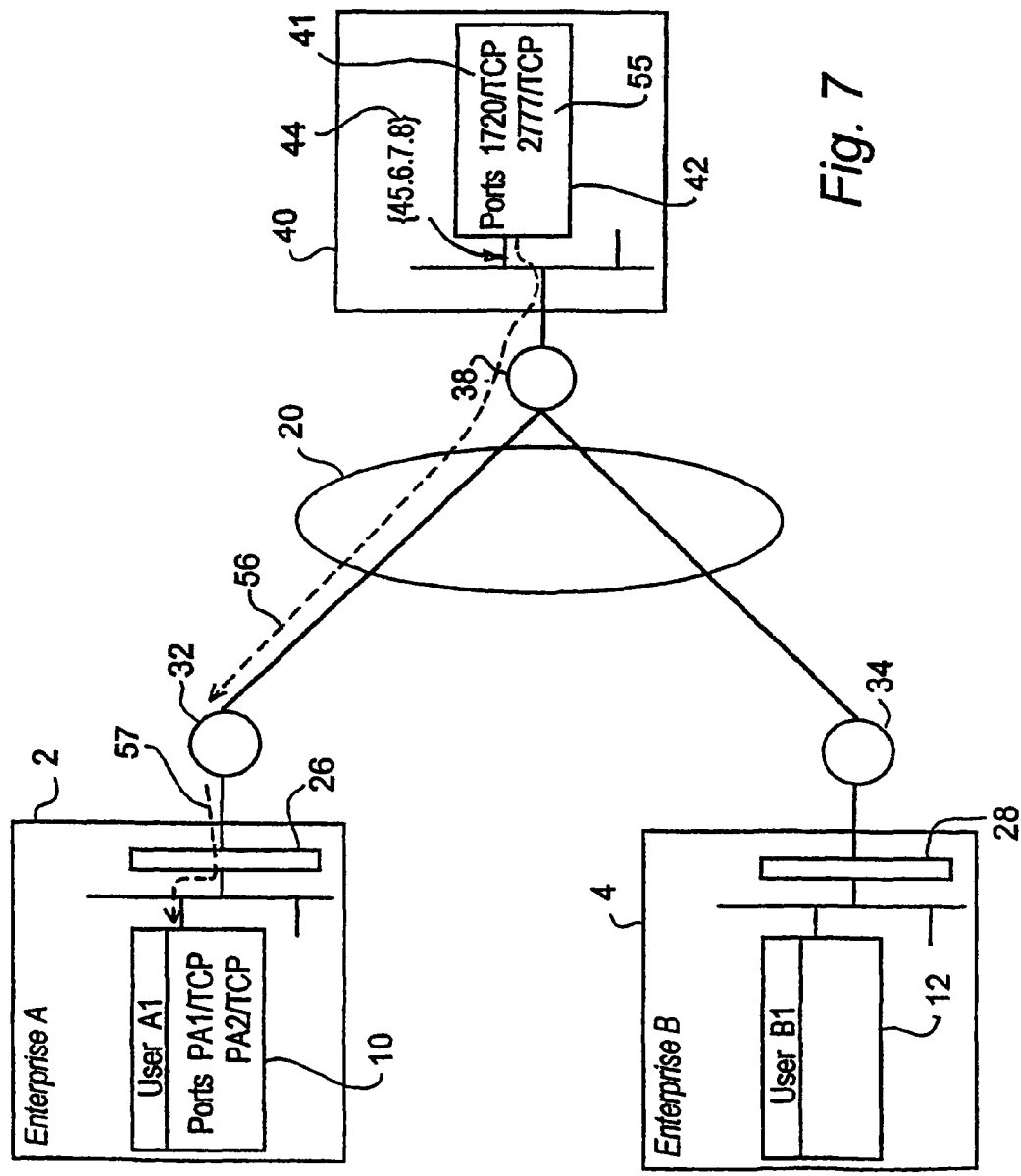

Step 5, FIG. 7:

The proxy server 42 sends an H.323 "connect" message 56 to terminal A1 10 at IP address 192.1.1.1/PA1. The message names the IP address 45.6.7.8/2777 as the port to which terminal A1 10 should make an H.245 connection.

This is represented by:

| TCP Packet | | Source | IP/Port: 45.6.7.8/1720 |
|---|---|---|---|
| | | Destination | IP/Port: 192.1.1.1/PA1 |
| H.323 | | H.245 address | IP/Port: 45.6.7.8/2777 |

The router 34 translates the message 57 and forwards this to the terminal A1 10 as:

| TCP Packet | | Source | IP/Port: 45.6.7.8/1720 |
|---|---|---|---|
| | | Destination | IP/Port: 10.1.1.1/PA1 |
| H.323 | | H.245 address | IP/Port: 45.6.7.8/2777 |

Figure 8:
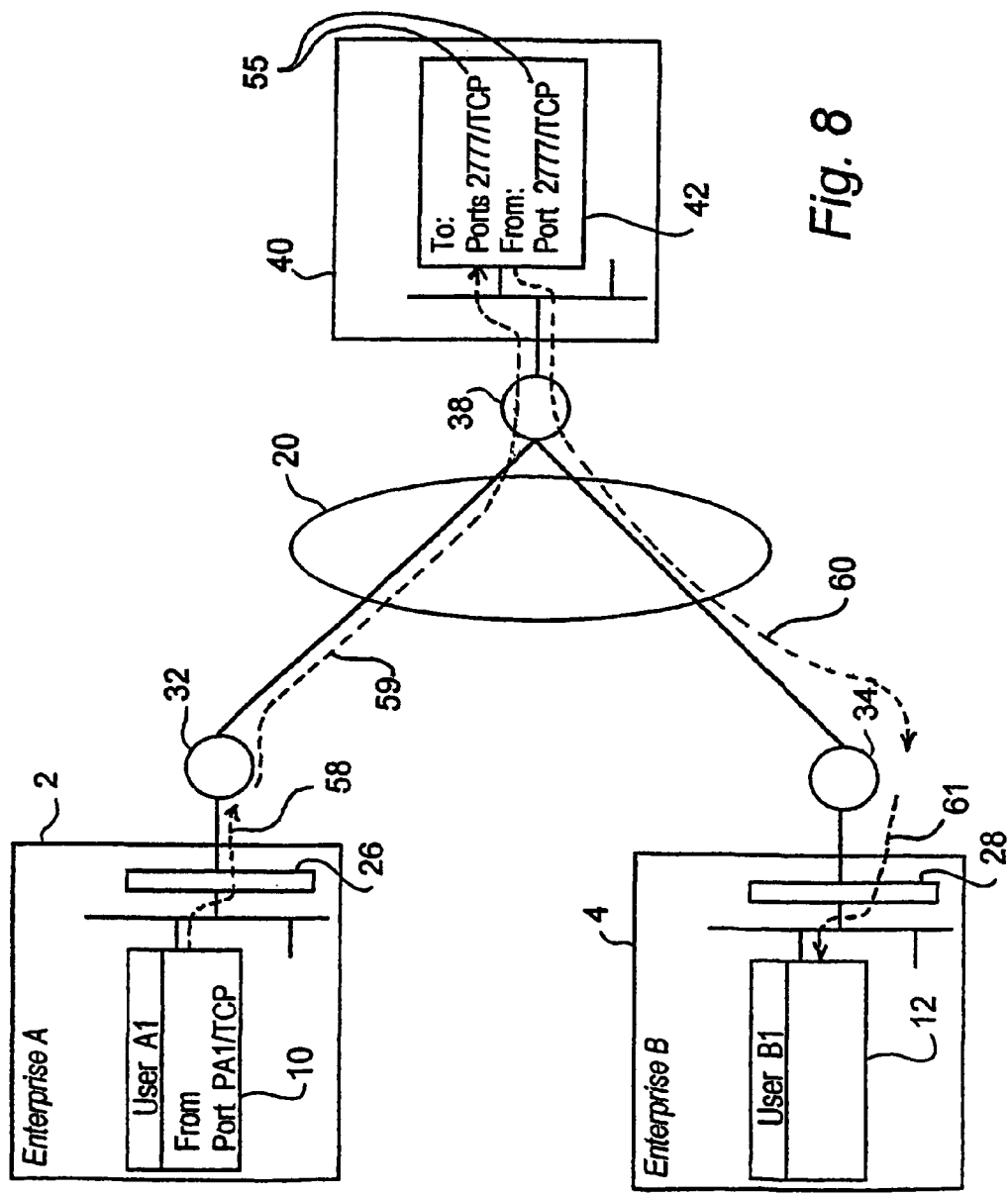

Step 6, FIG. 8:

Next, two events take place, either independently, or one after the other. First, terminal A1 10 establishes H.245 communications with the proxy server 42. The IP packets 58,59 that carry the H.245 communication are subject to the translations at the router 32 as the initial setup messages described above. Second, the proxy server 42 makes a similar H.245 connection 60,61 to the terminal B1 12 via the router 34, with address translation in the same manner as described above. At this stage, there are no IP address carried in the H245 messages 58,59;60,61.

Step 7, FIGS. 9A to 9E:

Terminals A1 10 and B1 12 follow normal H.245 protocols to open logical channels to carry audio and/or video signals. Each channel carries either audio or video, but never both. The process is the same for all channels. A number of ports 27,29 are opened in both the terminals 10,12 and the proxy server 42, as shown in summary form in FIG. 9A.

The order in which the various ports are opened can vary, and one particular example is described here. In particular, although the steps shown in FIG. 9E are shown occurring after those of FIG. 9D, the steps of FIG. E may happen either before those shown in FIG. 9C, or between those shown in FIGS. 9C and 9D.

Figure 9A:
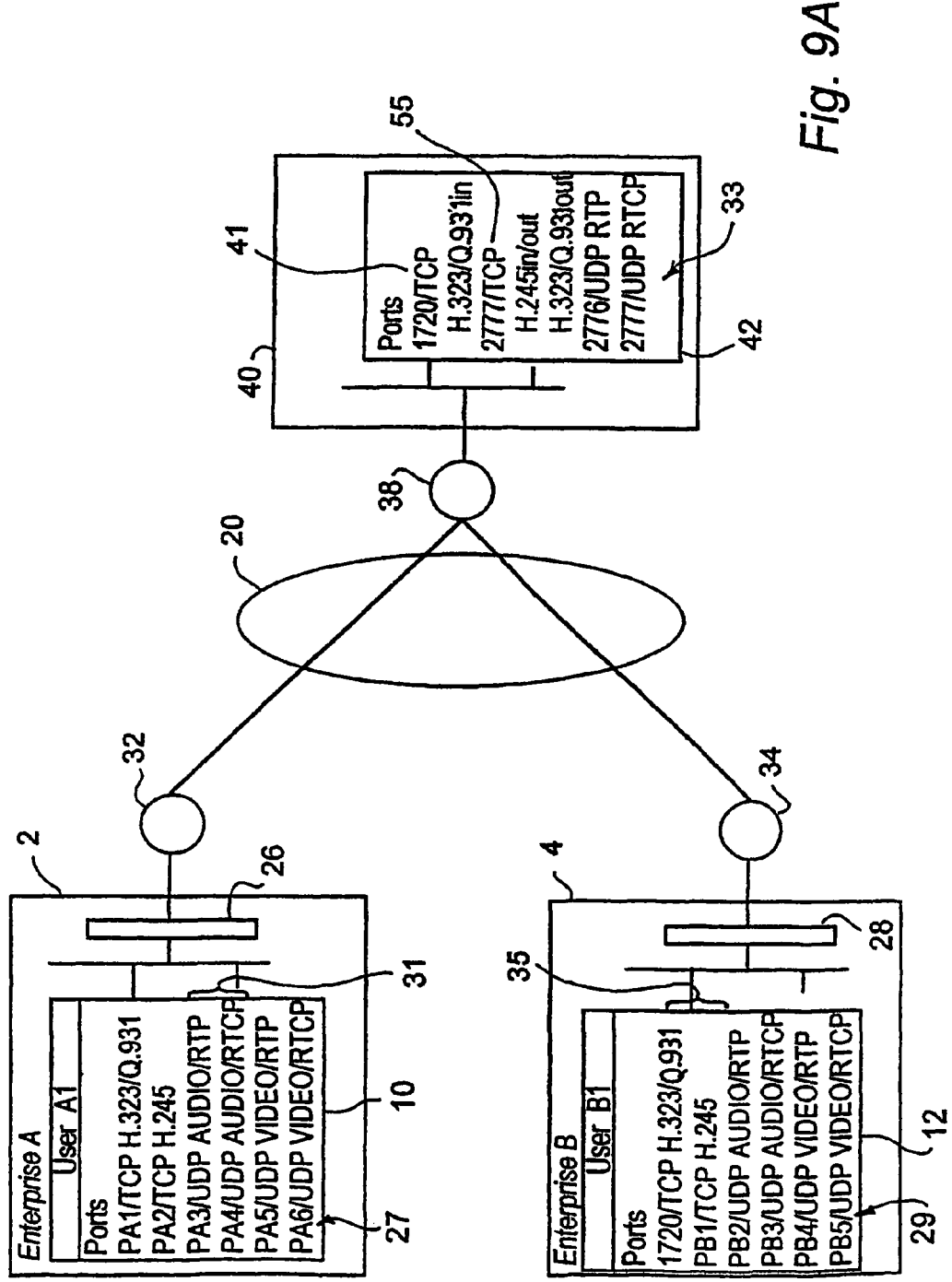
Figure 9B:
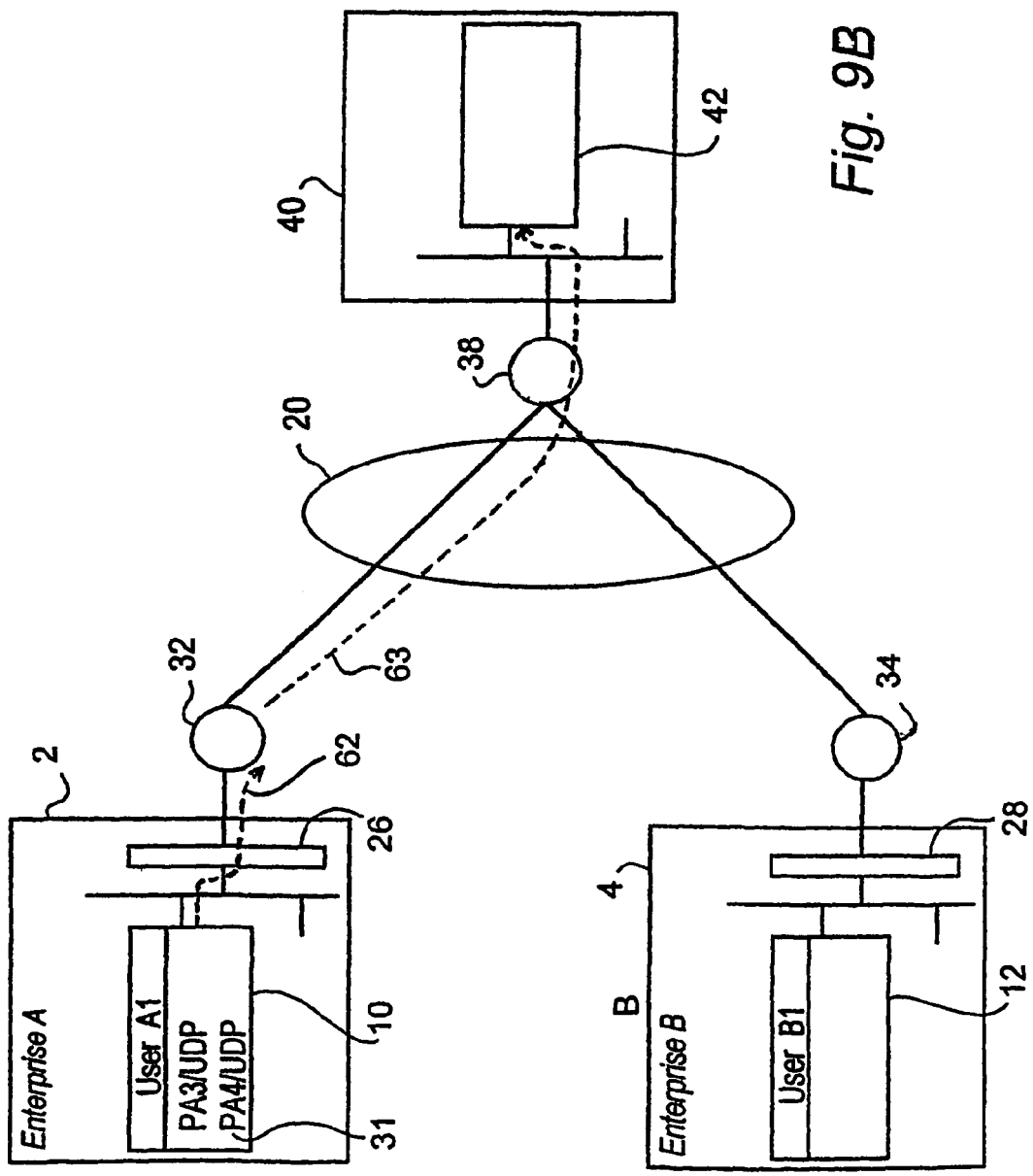

First as shown in FIG. 9B, terminal A1 10 sets up a dynamic port pair PA3/UDP and PA4/UDP 31 as an audio channel for sending audio. Numerically, according to the rules for RTP communication (standard IETF RFC 1889), PA4=PA3+1, and PA3 is an even number. Port PA3 is used for RTP communication, and port PA4 is used for RTCP communication.

Terminal A1 10 sends the necessary "open logical channel" message 62 to the proxy server 42. The NAT function in the router 32 forwards a translated message 63 and IP packets as:

| | | | | Before | After |
|---|---|---|---|---|---|
| TCP | | Source | IP/Port: | 10.1.1.1/PA2 | 192.1.1.1/PA2 |
| | | Destination | IP/Port: | 45.6.7.8/2777 | 45.6.7.8/2777 |
| RTCP | | Address | | 10.1.1.1/PB4 | unchanged |

Then as shown in FIG. 9C, the proxy server 42 composes a similar new message 64 to terminal B1 12. The proxy server 42 places the identity of the pre-assigned ports in this message, along with information about the nature of the signal. The message 64 is constructed with 45.6.7.8/2777 (UDP) as the RTCP address at the proxy server. The encoding method may be the same as the encoding method selected by terminal A1, or it may be different. The proxy server 42 then transmits the message 64 in IP packets to terminal B1 12's public IP address 17.

The message passes through the simple NAT function at the router 34. This changes the destination IP address in the packets to be terminal B1 12's true address 16. The terminal receives the message 65, and opens a pair of dynamic ports 35 to receive the signal.

This is represented by:

| | | | | Before | After |
|---|---|---|---|---|---|
| TCP | | Source | IP/Port: | 45.6.7.8/2777 | 45.6.7.8/2777 |
| | | Destination | IP/Port: | 206.1.1.1/PB1 | 10.1.1.1/PB1 |
| RTCP | | Address | | 45.6.7.8/2777 | unchanged |

Figure 9D:
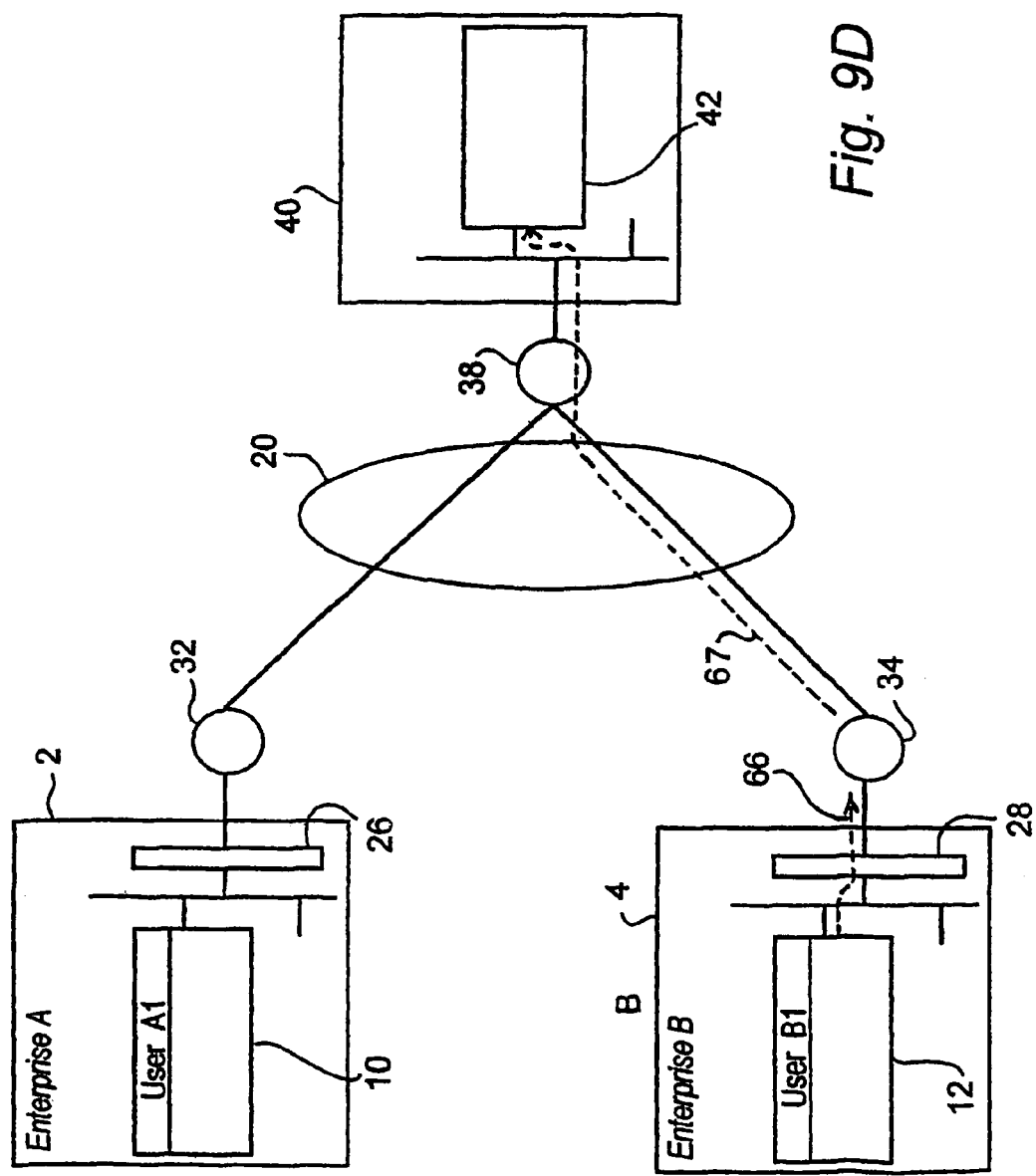
Figure 9E:
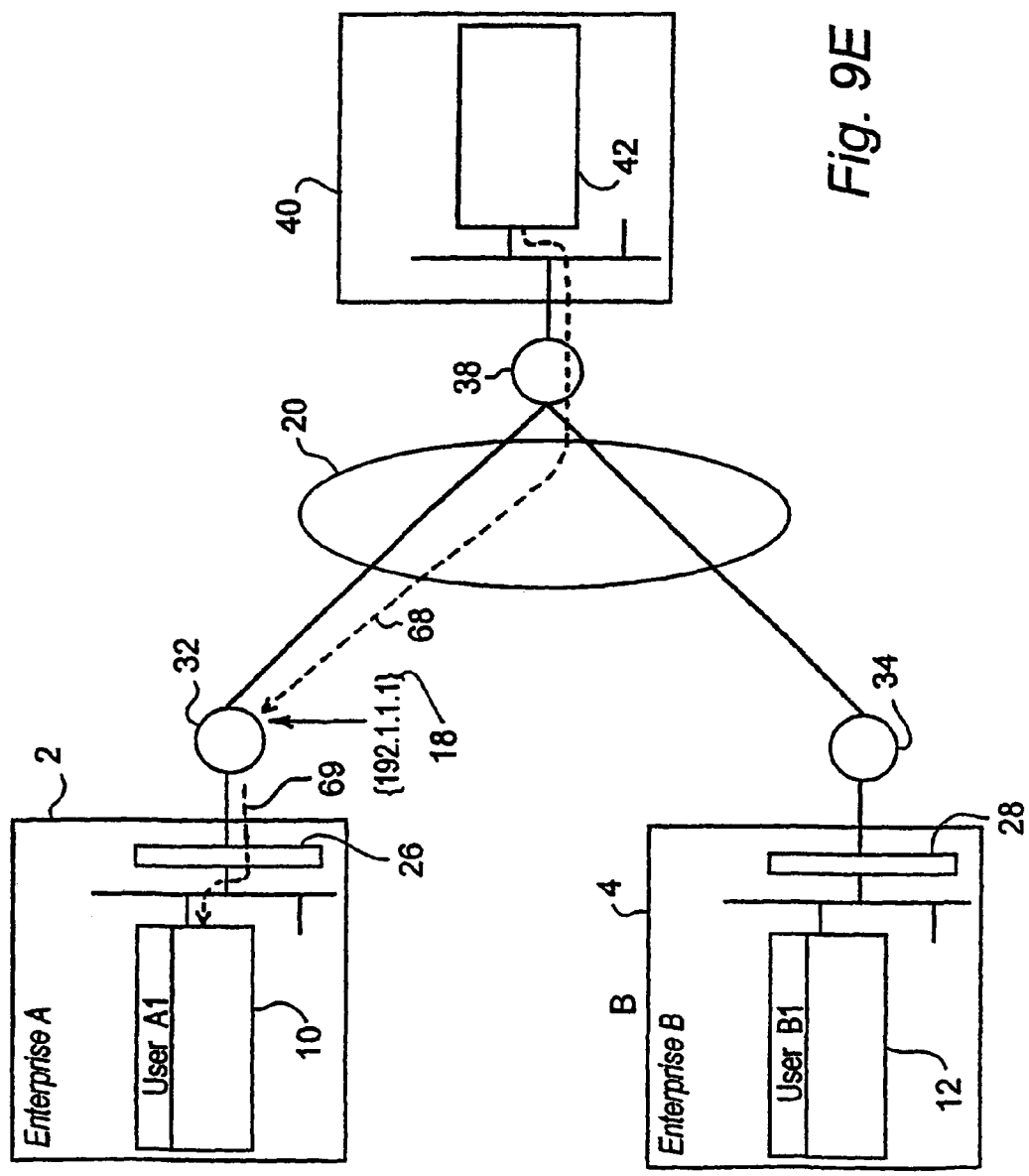

Then, as shown in FIG. 9D, the terminal B1 12 replies with an "open logical channel acknowledge" response 66 that contains the true IP addresses 16 of terminal B1 12, and the port numbers of the dynamic ports 35 that the terminal B1 has opened.

The "open logical channel acknowledge" message 66 gives the RTP and RTCP addresses of the terminal B1 12, here 10.1.1.1/PB2 and 10.1.1.1/PB3. In this example, PB2 is an even number, and PB3=PB2+1. This message 66 is placed into IP packets having a source IP address equal to the true IP address 16 of the terminal B1 12, and a destination address equal to the IP address 44 of the proxy server 42. The message 66 passes through the router 34 which uses the simple NAT function to forward a translated message 67 to the proxy server 42 having the true IP address 16 of terminal B1 12 changed to the public IP address 17. The packet reaches the proxy server 42, which uses the dynamic port numbers from the message plus the public IP address (206.1.1.1) of terminal B1 12 to open its pre-assigned ports 33 to send the audio signal to terminal B1 12. The router 34 does not change the addresses' in the H.323 message.

This is represented by:

| | | | | Before | After |
|---|---|---|---|---|---|
| TCP | | Source | IP/Port: | 10.11.1/PB1 | 206.1.1.1/PB1 |
| | | Destination | IP/Port: | 45.6.7.8/2777 | 45.6.7.8/2777 |
| RTP | | Address | | 10.1.1.1/PB2 (UDP) | unchanged |
| RTCP | | Address | | 10.1.1.1/PB3 (UDP) | unchanged |

Finally, as shown in FIG. 9E, the proxy server 42 transmits an "open logical channel acknowledge" response 68 to the public IP address 18 of terminal A1 10 to tell the terminal the ports that will receive the audio signal. In this example, the message lists the pre-assigned ports 2776/UDP and 2777/UDP at the proxy server 42 as the ports for RTP and RTCP respectively. The router 32 modifies the IP address of the terminal in the IP packet of the forwarded message 69, but makes no change to the response itself. The terminal receives this message 69, and begins to send the audio signal.

The setup message altered by the router 32 is translated as follows:

|  |  |  | Before | After |
|---|---|---|---|---|
| TCP | Source | IP/Port: | 45.6.7.8/2777 | 45.6.7.8/2777 |
|  | Destination | IP/Port: | 192.1.1.1/PA2 | 10.1.1.1/PA2 |
| RTP | Address |  | 45.6.7.8/2776 | unchanged |
| RTCP | Address |  | 45.6.7.8/2777 | unchanged |

Multimedia communication ("media data") may then flow between the two terminals 10,12. As terminal A1 10 generates media data for the new channel, it sends it from a new third port 10.1.1.1/PA3 to the proxy server 42 at 45.6.7.8/2776. The proxy server 42 receives the media data, and determines from the apparent source address that the packets are intended for the logical channel, and forwards them to B1 12 by sending them from 45.6.7.8/2776 to terminal B1 12 at 206.1.1.1/PB2. The proxy server 42 may perform processing before sending the media data onwards, or it may forward the media data unaltered.

In this example, the proxy server 42 must record the apparent or "public" IP address 18, here 192.1.1.1, of terminal A1 10 because it will not have direct access to the true originating address 14, here 10.1.1.1, as it receives the packets of media data.

The invention described above allows H.323 endpoints located in different secure and private IP data networks to communicate with each other without compromising the data privacy and data security of the individual private networks. The invention relates to a method and apparatus that has the advantage of working with existing firewalls, routers and proxies thus saving the costs of upgrading those devices to be fully H.323 compliant or deploying additional H.323 devices. One aspect of the invention presented herein applies to those deployments where simple (1-to-1) NAT (Network Address translation) mapping may be applied at the edge of the private networks, or where NAT may be bypassed. A separate aspect of the invention applies to deployments where NAPT (Network Address and Port Translation) is applied at the edge of the private networks. The two aspects of the invention can coexist and the apparatus can allow communications to take place between private networks following one method and private networks following the other method. Similarly within a single private network, some terminals may use one method (e.g. dedicated room systems) whereas other terminals may use the second method (e.g. desktop client PCs).

The invention presented herein are illustrated with reference to the ITU H.323 standard as that is the predominant standard for multimedia communications over packet networks including IP networks. However, it is equally applicable to other standards or methods that need to dynamically assign ports to carry bi-directional information, for example SIP, MGCP and H.248.

In summary, the invention provides a method and a system for allowing H.323 terminals located in private IP networks that: does not compromise the existing security procedures and measures; that avoids the need to upgrade existing firewalls, routers and proxies; and that avoids the deployment in the private network of additional specialist H.323 equipment. The invention also permits standard H.323 equipment in one private network to communicate with other H.323 terminals in the same or different private and/or public IP networks via an H.323 proxy server using a shared or public IP network.

Note that the static private IP address of an H.323 terminal may in fact be the same as the public IP address to which it is mapped, in which case the one-to-one mapping is transparent.

The advantages of the approach described above are that:
NAT and firewall functions do not need to be upgraded.
Connectivity may be provided by a service provider through a shared network, or by enterprises themselves using the public Internet
Latency of the signal is kept to a minimum.
Organisations can therefore subscribe to a shared resource in a shared IP network. Costs are kept to a minimum/shared and security is not compromised.

It is to be recognized that various alterations, modifications, and/or additions may be introduced into the constructions and arrangements of parts described above without departing from the spirit or scope of the present invention, as defined by the appended claims.

What is claimed is:

1. A communications system for making a multimedia call, comprising:

a first multimedia terminal configured to communicate using H.323;

a second multimedia terminal configured to communicate using H.323;

a first communication unit, associated with the first multimedia terminal, configured to establish a multimedia call over a shared IP network between said first multimedia terminal and the second multimedia terminal using H.323, said communication unit including a first firewall through which the multimedia call passes, wherein the first firewall is configured to restrict certain types of communication between the first terminal and the shared IP network, each of the first multimedia terminal and the second multimedia terminal has a number of logical communication ports for transmitting or receiving the multimedia call, including at least one dynamically assigned port; and a transmitter, associated with the first multimedia terminal is configured to send a request to the second multimedia terminal to open up one or more dynamic ports in the second multimedia terminal;

a proxy server disposed between the first multimedia terminal and the second multimedia terminal that is configured to act as a proxy for the first multimedia terminal and the second multimedia terminal during the multimedia call, wherein the proxy server has logical communication ports for communication with the first multimedia terminal, including one or more pre-assigned ports for communication with the first multimedia terminal;

the first firewall is configured not to restrict communication between the first multimedia terminal and the one or more pre-assigned ports of the proxy server for communication with the first multimedia terminal, and the proxy server is configured to receive the request to open up said one or more dynamic ports in the second multimedia terminal via one of the proxy server's pre-assigned ports and to modify the request to change a source of the request from a network address of the first multimedia terminal and the at least one dynamically assigned port of the first multimedia terminal to a network address of the proxy server and a pre-assigned port of the proxy server for communication with the second multimedia terminal.

2. The communication system as claimed in claim 1, further comprising:

a second communication unit, associated with the second multimedia terminal, which includes a second firewall through which the multimedia call passes through;

the second firewall is configured to restrict some communication between the second multimedia terminal and the shared communications network;

the proxy server has logical communication ports for communication with the second multimedia terminal, including one or more pre-assigned ports for communication with the second multimedia terminal; and the second firewall is configured not to restrict communication between the second multimedia terminal and the one or more ports of the proxy server for communication with the second multimedia terminal.

3. The communication system of claim 1, wherein a number of pre-assigned ports of the proxy server is less than or equal to a total number of dynamically assigned ports for the first multimedia terminal.

4. The communication system of claim 3, wherein the proxy server has at least one pre-assigned port number.

5. The communication system of claim 4, wherein the proxy server has two pre-assigned port numbers.

6. The communication system of claim 1, wherein the first multimedia terminal is configured to transmit or receive multimedia media signals together with associated multimedia control signals, the control signals being sent to one of the pre-assigned ports of the proxy server and the media signals being sent to another of the pre-assigned ports of the proxy server.

7. The communication system of claim 1, wherein at least one of the logical communications ports is a pre-assigned port, and the transmitter associated with the first multimedia terminal is configured to send said request to the pre-assigned port as an initial request to initiate the multimedia call.

8. The communication system of claim 1, wherein the first communication unit is configured to establish the multimedia call at least in part via the internet, and the proxy server has one or multiple public internet protocol addresses by which the first multimedia terminal communicates with the proxy server, the first firewall being configured not to restrict communication between the first multimedia terminal and the one multiple public internet protocol addresses and the one or more pre-assigned port numbers of the proxy server.

9. The communication system of claim 1, wherein there is a plurality of pairs of first multimedia terminals and second multimedia terminals.

10. The communication system of claim 1, wherein the first communication unit is configured to establish the multimedia call according to H.323 standard of International Telecommunications Union.

11. The communications system of claim 1, wherein the first communication unit is configured to establish the multimedia call according to a SIP standard of Internet Engineering Task Force.

12. The communications system of claim 1, wherein the first communication unit is configured to establish the multimedia call according to MGCP standard of Internet Engineering Task Force.

13. The communications system of claim 1, wherein the first communication unit is configured to establish the multimedia call according to H.248 standard of ITU.

14. The communications system of claim 1, further comprising another proxy server serving a remote community of terminals and endpoints.

15. The communications system of claim 1, the proxy server is a third-party device deployed to enable communication services between enterprises.

16. The communications system of claim 1, wherein the proxy server is configured to be controlled by an enterprise of the first multimedia terminal to enable external communication service with other enterprises, service providers or its remote branches.

17. The communications system of claim 1, wherein the proxy server is configured to implement a gatekeeper function.

18. The communications system of claim 1, wherein a gatekeeper function is a separate system from the proxy server.

19. The communication system of claim 1, wherein the request includes a payload that identifies the first multimedia terminal as a source of the request and the proxy server as a destination, and the proxy server is configure to modify the payload to change the source to the network address of the proxy server and the destination to a network address of the second multimedia terminal.

20. The communications system of claim 1, wherein the proxy server is configured to send a connect message to the first multimedia terminal in response to the proxy server receiving a connect message from the second multimedia terminal.

21. A method of making a multimedia call using a communications system that includes a first multimedia terminal configured to use H.323 and a second multimedia terminal configured to use H.323, the method comprising:

establishing a multimedia call over a shared IP network between said first multimedia terminal and the second multimedia terminal with a communication unit associated with the first multimedia terminal using H.323, said communication unit including a first firewall through which the multimedia call passes, wherein the first firewall is configured to restrict certain types of communication between the first terminal and the shared IP network, and each of the first multimedia terminal and the second multimedia terminal has a number of logical communication ports for transmitting or receiving the multimedia call, including at least one dynamically assigned port;

transmitting, with a transmitter associated with the first multimedia terminal, request to the second multimedia terminal to open up one or more dynamic ports in the second multimedia terminal;

using a proxy server disposed between the first multimedia terminal and the second multimedia terminal as a proxy for the first multimedia terminal and the second multimedia terminal during the multimedia call, the proxy server having logical communication ports for communication with the first multimedia terminal, including one or more pre-assigned ports for communication with the first multimedia terminal;

the first firewall allowing communication between the first multimedia terminal and the one or more pre-assigned ports of the proxy server for communication with the first multimedia terminal;

receiving, at the proxy server, the request to open up said one or more dynamic ports in the second multimedia terminal via one of the proxy server's pre-assigned ports; and modifying the request to change a source of the request from a network address of the first multimedia terminal and the at least one dynamically assigned port of the first multimedia terminal to a network address of the proxy server and a pre-assigned port of the proxy server for communication with the second multimedia terminal, wherein the modifying is performed by the proxy server.

* * * * *